(12) United States Patent
Ashford

(10) Patent No.: US 7,489,411 B2
(45) Date of Patent: Feb. 10, 2009

(54) APPARATUS AND METHODS FOR CALIBRATING A LASER PROJECTION DEVICE

(75) Inventor: Curtis M. Ashford, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 513 days.

(21) Appl. No.: 11/190,265

(22) Filed: Jul. 27, 2005

(65) Prior Publication Data

US 2007/0024810 A1 Feb. 1, 2007

(51) Int. Cl.
*G01B 11/14* (2006.01)
(52) U.S. Cl. .................. 356/620; 356/614; 356/622
(58) Field of Classification Search ........... 33/227–299; 356/614–624
See application file for complete search history.

(56) References Cited

U.S. PATENT DOCUMENTS

| 3,723,013 | A | * | 3/1973 | Stirland et al. | ........... 356/152.1 |
| 3,754,249 | A | * | 8/1973 | Kearney, II | ................ 342/54 |
| 3,778,169 | A | * | 12/1973 | Adams | .................. 356/399 |
| 3,902,810 | A | * | 9/1975 | Hamar | .................. 356/138 |
| 4,730,928 | A | * | 3/1988 | Gabriel et al. | ............. 356/622 |
| 4,772,122 | A | * | 9/1988 | Kasner | ............... 356/139.05 |
| 4,840,490 | A | * | 6/1989 | Gabriel et al. | ............. 356/622 |
| 5,073,005 | A | | 12/1991 | Hubbs | |
| 5,202,168 | A | * | 4/1993 | Turner et al. | .............. 428/41.8 |
| 5,261,822 | A | * | 11/1993 | Hall et al. | ................. 434/271 |
| 5,825,558 | A | * | 10/1998 | Farmiga et al. | ............ 359/819 |
| 6,308,428 | B1 | * | 10/2001 | Creighton, III | .............. 33/286 |
| 6,616,452 | B2 | * | 9/2003 | Clark et al. | .................. 434/19 |
| 7,015,459 | B2 | * | 3/2006 | Slesinski et al. | ............ 250/239 |
| 7,158,241 | B2 | * | 1/2007 | Slesinski et al. | ............ 356/620 |
| 7,304,728 | B2 | * | 12/2007 | Chang et al. | ............. 356/141.3 |
| 2005/0092908 | A1 | | 5/2005 | Slesinski et al. | |

FOREIGN PATENT DOCUMENTS

| GB | 1265977 A | 3/1972 |
| JP | 07306045 A | 11/1995 |

OTHER PUBLICATIONS

Mike Walker; Patents Act 1977: Combined Search and Examination Report under Sections 17 and 18(3) and Search Report under Section 17; Nov. 22, 2006; 6 pages.

* cited by examiner

*Primary Examiner*—L. G Lauchman
*Assistant Examiner*—Jarreas C Underwood
(74) *Attorney, Agent, or Firm*—Harness, Dickey & Pierce, P.L.C.

(57) ABSTRACT

An apparatus for calibrating a laser projection device can be used to establish the deviation of known measurement points from an approved digital model or reference condition. The apparatus includes a target having a reflective portion and a mask surrounding the reflective portion. The mask includes a material that changes appearance when excited by a laser. This target eliminates or minimizes user subjectivity in laser projection calibration.

13 Claims, 2 Drawing Sheets

APPARATUS AND METHODS FOR CALIBRATING A LASER PROJECTION DEVICE

FIELD OF THE INVENTION

The present invention relates generally to laser projection technology and more particularly (but not exclusively) to calibrating laser projection devices.

BACKGROUND OF THE INVENTION

Laser projection technology is in widespread use as a manufacturing aid to determine the presence or absence of features in a manufactured article. Laser projection can be useful on a factory floor to support precision assembly and manufacturing. Its usefulness, however, is contingent on accurate calibrating and positioning of the laser beam. Calibration is typically subject to an operator's determination as to whether or not the beam is at a desired location. Calibration thus can be influenced by operator bias.

SUMMARY OF THE INVENTION

In one implementation, the invention is directed to an apparatus for use with a laser projection device. The apparatus includes a target having a reflective portion and a mask surrounding the reflective portion. The mask includes a material that changes appearance when excited by a laser.

In another implementation, the invention is directed to a method of using a laser projection device relative to an article. The laser projection device and one or more targets are positioned relative to the article. A laser is projected from the projection device toward one of the one or more targets. If the beam changes an appearance of a material surrounding a reflective portion of the one target, the method includes repositioning at least one of the one target and the laser.

In yet another implementation, the invention is directed to a laser projection system including a laser projection device and one or more targets for use with the laser projection device. The system includes a calibration wall having a wall surface and a plurality of target positioning stages affixed to the wall surface. Each positioning stage is configured to receive a target and operable to reposition the received target relative to the wall surface.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses. The present invention, in some configurations, is directed to an apparatus for use with a laser projection device. The apparatus includes a target having a mask that covers a portion of the target while exposing a reflective portion of the target. The mask includes a material that changes appearance when excited by a laser. It should be noted that the invention can be practiced relative to many different target types, sizes, shapes and uses.

Figure 1:
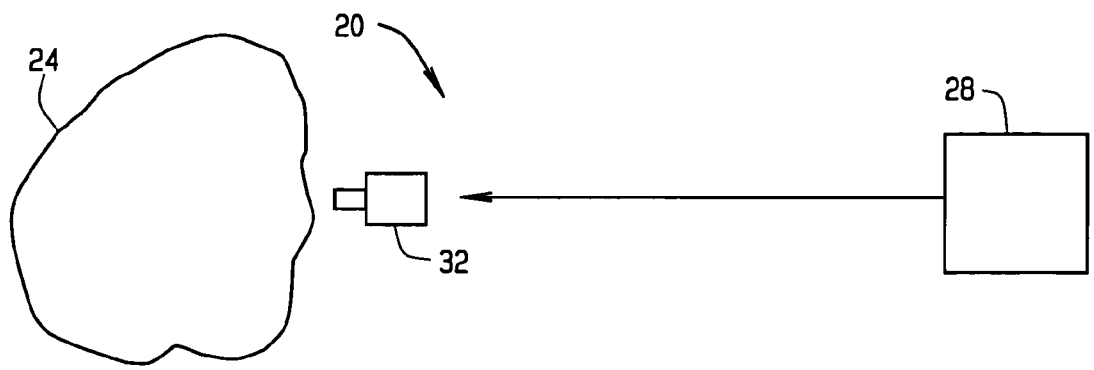
FIG. 1 is a block diagram of a system used in relation to articles of manufacture in accordance with one implementation of the invention.

A laser projection system used in relation to articles of manufacture in accordance with one implementation of the invention is indicated generally in FIG. 1 by reference number 20. The system 20 may be used, for example, to project illuminated lines onto the surface of an article 24. The illuminated lines may be used to guide in configuring the article 24 with other components to produce a finished product. Additionally or alternatively, the system 20 could be used in various applications, for example, to indicate where component parts are to be cut or trimmed.

The system 20 includes a laser projection device 28, a processor (not shown) for controlling the projection device 28, and one or more reflective targets 32 for use in aligning the projection device 28 relative to the article 24. The target(s) may be mounted, for example, to a support for the article 24 or to another structure (not shown). Although one target 32 is shown in FIG. 1, generally six or more targets are used in laser projection applications. Before a laser projection application is performed, the laser projection device 28 may be aimed at each of the target(s) to obtain a set of positional coordinates for locating the article 24. The coordinates are input to the projection device processor for subsequent use in directing the projection device 28 to project a laser beam relative to the article 24.

Figure 2A:
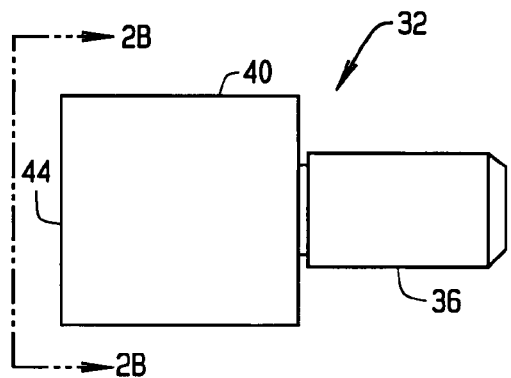
FIG. 2A is a side view of a target in accordance with one implementation of the invention.
Figure 2B:
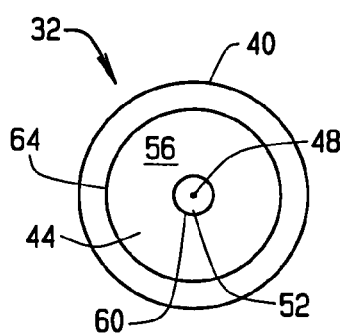
FIG. 2B is a frontal view of the target shown in FIG. 2A, taken in the plane of the line 2B-2B indicated in FIG. 2A.

The target 32 is shown in greater detail in FIGS. 2A and 2B. The target 32 includes a mounting stem 36 and body 40 made, for example, of metal. A surface 44 of the body is configured to reflect a laser. Target configurations are contemplated in which various mounting arrangements are provided. Such arrangements include using an x-y positioning stage and calibration wall for precise target repositioning as further described below. In some configurations, targets and/or target surfaces may be provided on a roll of tape, and the tape may be applied to an object as may be desired. Configurations also are contemplated in which no mounting arrangements are provided.

Referring to FIG. 2B, the surface 44 includes a central reflective portion 48. The reflective portion 48 is, for example, part of a retro-reflective substrate 52 covering at least part of the surface 44. A mask 56 covering part of the substrate 52 surrounds and exposes the reflective portion 48. The mask 56 includes a material that changes appearance when excited by a laser. For example, the mask 56 may include a fluorescent material that turns from an orange to a yellow color when excited by a green laser. In some embodiments, orange fluorescent tape is used. In some other embodiments, orange fluorescent plastic and/or orange fluorescent paint could be used. In various configurations, various materials could be used which change color or otherwise change appearance when excited by a laser.

One exemplary target is a modified retroflective target No. TSOR by Hubbs Machine & Manufacturing, Inc. of Cedar Hill, Mo. The target body 40 is approximately 12 millimeters in length and diameter and the stem 36 is approximately 6 millimeters in diameter. Mask overlay inner diameter 60 and outer diameter 64 are application-dependent.

It can be appreciated that there are many different ways to configure a target, a reflective surface and a mask. In some configurations, a mask may cover areas of reflective substrate to greater or lesser degrees than as described in the present example. In some configurations, a mask may not cover any reflective substrate. In some configurations, an appearance-changing surface could be partially overlaid by a reflective surface. Accordingly, it should be noted that the term "mask" is used herein to describe an appearance-changing surface which does not necessarily cover any part of a reflective surface. Additionally or alternatively, a reflective surface may not be centrally positioned relative to the target in some configurations but may be oriented differently to accommodate various aspects of various applications. Further, a target surface could be provided in other than in circular forms.

Referring to FIG. 1, when the system 20 is in use, the laser projection device 28 is positioned relative to the article 24 and target(s) 32. In calibrating the system 20, a laser is projected toward a target 32. If the laser is correctly aligned when it strikes the target, it strikes the central reflective portion 48. If the beam strikes accurately, the mask 56 remains unexcited by the beam. If the laser beam strikes off-center relative to the target reflective portion and strikes an area of the mask 56, the mask changes appearance in the stricken area. The area of appearance change can indicate a direction in which to reposition the laser beam.

Figure 3:
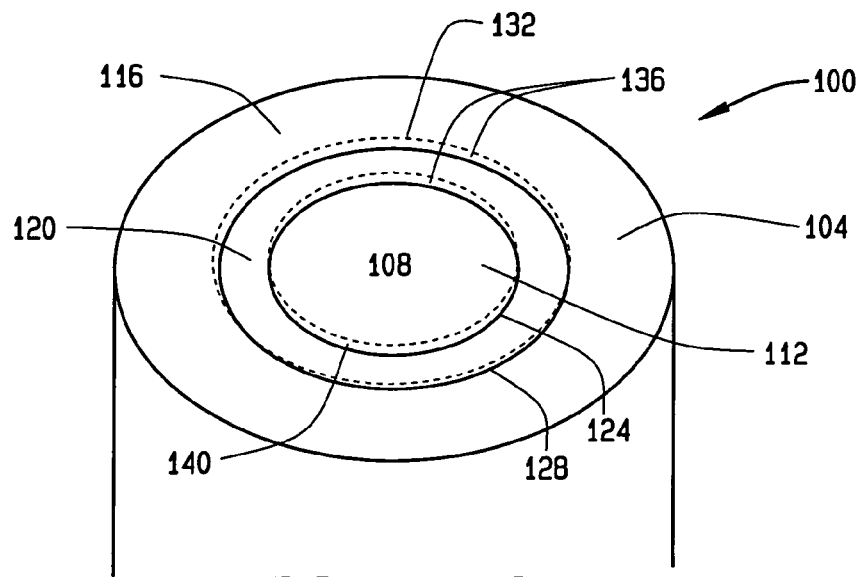
FIG. 3 is a perspective view of a target in accordance with one implementation of the invention.

A perspective view of another exemplary configuration of a target is indicated generally by reference number 100 in FIG. 3. The target 100 includes a surface 104 configured to reflect a laser. The surface 104 includes a central reflective portion 108. The reflective portion 108 is, for example, part of a retro-reflective substrate 112 covering at least part of the surface 104. A mask 116 covering part of the substrate 112 surrounds and exposes the reflective portion 108. The mask 116 includes a material that changes appearance when excited by a laser. For example, the mask 116 may include a fluorescent material that turns from an orange to a yellow color when excited by a green laser.

The mask 116 includes one or more annular areas 120, one of which is shown in the present embodiment. The annular area 120 has an inner diameter 124 and outer diameter 128 that may be configured for use with a particular laser beam thickness. For example, the inner diameter 124 may indicate a nominal diameter of an exciting laser beam and the outer diameter 128 may indicate a maximum position error of the laser beam relative to the target 100. In one implementation, a green laser beam may be projected in a ring 132 (shown in dashed lines in FIG. 3) which, if accurately projected, would encircle the reflective portion 108. If the laser strikes the target 100 off-center, portions of the mask 116 near the diameters 124 and/or 128 may be excited to a yellow color and part of the reflective portion 108 may reflect the green color of the laser. For example, as shown in FIG. 3, areas 136 are excited to yellow and an area 140 of the reflective portion 108 reflects as green. The target 100 may then be moved, e.g., as further described below, to center the beam on the reflective portion 108. When the beam is centered, depending on the beam width, the reflective portion 108 no longer reflects the laser and areas near one or both of the diameters 124 and 128 fluoresce yellow in complete circles. It can be appreciated that mask diameters could be denoted and calibrated in a laser projection device in various ways to indicate various degrees of error in beam placement.

Figure 4:
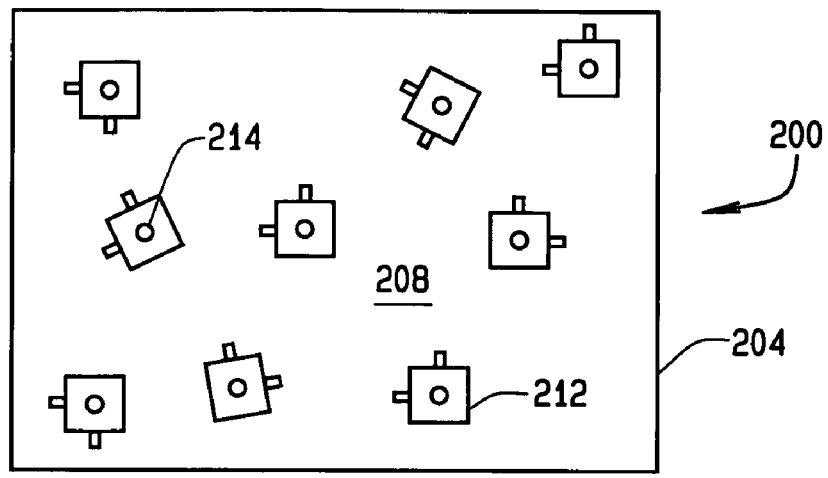
FIG. 4 is a frontal view of a calibration wall in accordance with one implementation of the invention.

One exemplary target mounting arrangement for use, e.g., in calibrating a laser project system is indicated generally in FIG. 4 by reference number 200. A calibration wall 204 has a wall surface 208 and a plurality of target positioning stages 212 affixed to the wall surface 208. Each positioning stage 212 is configured to receive a target 214 and is operable to reposition the received target 214 relative to the wall surface 208.

Figure 5:
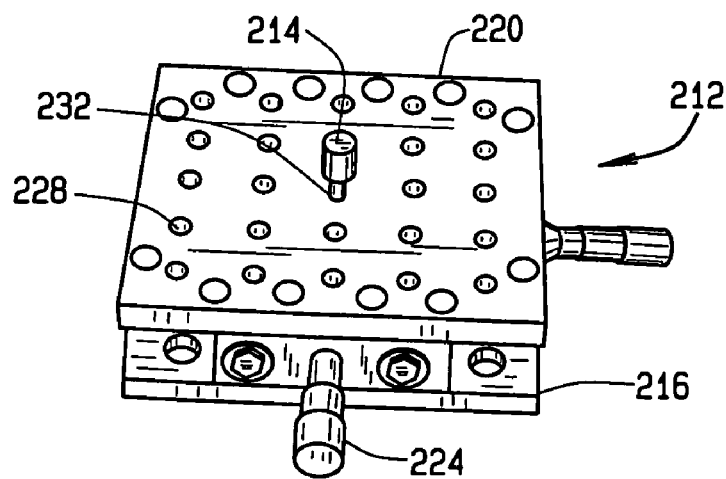
FIG. 5 is a perspective view of a positioning stage and target mounted thereon in accordance with one implementation of the invention.

A positioning stage 212 is shown in greater detail in FIG. 5. The stage 212 has a base 216 attachable to the wall surface 208. A platform 220 is adjustable in at least two orthogonal directions by means of a pair of micrometers 224. The platform 220 includes one or more sockets 228 into which a target 214 may be mounted. As shown in FIG. 5, a single target 214 is mounted in a center socket 232.

To calibrate a laser projection device, a plurality of positioning stages 212 are placed on the calibration wall surface 208. A target 214 may be mounted in a center socket 232 of each of the positioning stages 212. In some implementations, more than one target 214 may be mounted on one or more of the stages 212. Position coordinates for each of the targets 214 are entered into the laser projection device. When a target 214 is excited by the device as previously described with reference to FIGS. 1, 2A, 2B and 3, it is determined whether the beam is in alignment with the target 214.

If an alignment adjustment is to be made, the positioning stage platform 220 upon which the target 214 is mounted is moved in one or more directions to move the target 214 relative to the calibration wall 204. Because micrometers 224 are used to move the target 214, adjustment values are available from the micrometers 224 and can be entered into the laser projection device. In such manner, the position coordinates for the repositioned target can be adjusted to reflect the repositioning. The foregoing process may be repeated for each of the targets 214 mounted on the calibration wall to calibrate the laser projection device.

The foregoing target and mask can be configured to indicate whether a laser projection device is projecting within a predetermined tolerance. The target makes it possible for a metrology inspector to tell at a glance whether or not a projected laser beam is at a location programmed in a digital part file. Inspector subjectivity in the calibration process is eliminated or minimized. In implementations in which the foregoing calibration wall is used, the ability to move targets and to update target positional coordinates with data describing relative target movement simplifies and expedites calibration. Using configurations of the invention can reduce labor time for laser projection calibration and thus can reduce costs.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for use with a laser projection device, the apparatus comprising a target having a reflective portion and a mask having an annular area surrounding the reflective portion;
    the mask comprising a material that changes appearance when excited by a laser;
    the annular area configured for use with a laser beam having a nominal diameter and maximum positioning error and projected as a ring onto the target, the annular area having an inner diameter indicative of the nominal diameter, the annular area having an outer diameter indicative of the maximum positioning error;

wherein when the laser beam ring is centered on the reflective portion, the reflective portion reflects substantially none of the beam when a thickness of the beam is within the nominal diameter, and when the beam exceeds the maximum positioning error, one or more portions of the mask change appearance.

2. The apparatus of claim 1, wherein the material fluoresces when excited by a laser from the laser projection device.

3. The apparatus of claim 1, wherein the mask comprises more than one annular area surrounding the reflective portion, each annular area configured to indicate a different degree of positioning error when excited by the laser.

4. The apparatus of claim 1, wherein the material is excited by a beam from the projection device that is not centered on the reflective portion.

5. The apparatus of claim 1, further comprising a calibration wall on which the target may be mounted and moved, the wall further configured to provide a measurement of the target movement.

6. The apparatus of claim 1, wherein a color change in the material caused by a laser from the projection device indicates a direction in which to reposition the laser.

7. The apparatus of claim 1, wherein the mask covers a portion of the target while exposing the reflective portion.

8. A method of using a laser projection device relative to an article, the method comprising:

positioning the laser projection device and one or more targets relative to the article, each target having a reflective portion and a mask having one or more annular areas surrounding the reflective portion, at least one of the annular areas having an inner diameter indicative of a laser beam nominal diameter, the at least one of the annular areas having an outer diameter indicative of a laser beam maximum positioning error;

inputting position coordinates for each of the targets to the projection device;

projecting a laser beam from the projection device toward a given one of the one or more targets to delineate a ring around the reflective portion of the given target;

based on whether the given target reflective portion reflects any part of the projected beam, determining whether the projected beam exceeds the laser beam nominal diameter;

based on whether at least part of an annular area of the given target changes appearance when the beam is projected, determining whether the beam exceeds the laser beam maximum positional error;

based on the determining, repositioning at least one of the given target and the laser and adjusting the position coordinates in the projection device for the given target to reflect the repositioning;

at least the inputting, projecting and determining performed as to each of the targets to calibrate the laser projection device.

9. The method of claim 8, further comprising using fluorescence of a material of the mask to determine whether the laser projection device is projecting within a predetermined tolerance.

10. The method of claim 8, wherein the article includes a calibration wall.

11. The method of claim 10 wherein adjusting the position coordinates in the projection device comprises:

applying one or more micrometer adjustments to adjust one or more positioning stages of the calibration wall; and using the micrometer adjustments to adjust the position coordinates in the projection device.

12. The method of claim 8, further comprising repositioning the given target based on a color change in the mask.

13. The method of claim 8, further comprising operating a micrometer of a target positioning stage to reposition the given target.

* * * * *